United States Patent [19]

Labrador

[11] Patent Number: 4,756,666

[45] Date of Patent: Jul. 12, 1988

[54] UNITED SAIL WINDMILL

[76] Inventor: Gaudencio A. Labrador, 1312 Leaf Ter., San Diego, Calif. 92114

[21] Appl. No.: 631,321

[22] Filed: Jul. 19, 1984

[51] Int. Cl.$^4$ .......................... F03D 5/02; F03D 5/04
[52] U.S. Cl. .......................................... 416/8; 415/5
[58] Field of Search ............ 416/7, 8, DIG. 6, 132 B, 416/85, 240 A; 415/5

[56] References Cited

U.S. PATENT DOCUMENTS

| | | | |
|---|---|---|---|
| 443,641 | 12/1890 | Eastman | 416/240 A X |
| 1,046,026 | 12/1912 | Salisbury | 416/240 A |
| 1,266,472 | 5/1918 | Howe | 416/8 X |
| 1,526,631 | 2/1925 | Fagan | 445/5 |
| 2,454,058 | 11/1948 | Hays | 60/398 |
| 3,504,988 | 4/1970 | Stenner | 416/8 X |
| 3,996,741 | 12/1976 | Herberg | 60/398 |
| 4,052,134 | 10/1977 | Rumsey | 416/DIG. 6 X |
| 4,175,910 | 11/1979 | Nilberg | 416/8 |
| 4,182,128 | 1/1980 | Gardner | 60/398 |
| 4,206,608 | 6/1980 | Bell | 60/398 X |
| 4,302,684 | 11/1981 | Goging | 416/8 X |
| 4,303,834 | 12/1981 | Li | 446/8 X |
| 4,447,738 | 5/1984 | Allison | 290/55 X |

FOREIGN PATENT DOCUMENTS

| | | | |
|---|---|---|---|
| 2836922 | 3/1980 | Fed. Rep. of Germany | 416/85 |
| 993473 | 10/1951 | France | 416/DIG. 6 |
| 2312666 | 12/1976 | France | 416/240 A |
| 2523220 | 9/1983 | France | 416/119 |
| 25234 | of 1894 | United Kingdom | 416/85 |
| 1588600 | 4/1981 | United Kingdom | 416/7 |

Primary Examiner—Everette A. Powell, Jr.

[57] ABSTRACT

This windmill provides low cost energy out of the wind in the form of compressed air, etc, by maximizing wind-contact at the least cost of construction and maintenance, at the least cost of project site—making the "Output/Cost Ratio" very high. This is done by making the sails very large using light fabrics with aluminum or bamboo frames forming a square face, supported by light strong ropes; by arranging the sails on a single file close to one after the other at erect posture free to clip to the right or to the left, forming a long procession line transverse to the wind which is in close loop with another long procession line parallel to it but moving to the opposite direction, to produce a very large windmill without the need of additional set up units of windmills; by carrying said large sails high above the ground for better wind-contact thru a two level Aerial Cable Railway by means of a deep-groove roller wheel attached to the top end and to the bottom end of each sail-mast; by separating said two parallel lines of sails at least 100 feet apart for better wind-contact thru the use of set of three Terminal Gear Wheels at a Half-Hexagonal formation that hold the end loops of the Power Cable Chain being tugged by each sail; by making the windmill work during strong winds and storing the energy in compressed air tunnels, elevated water.

1 Claim, 5 Drawing Sheets

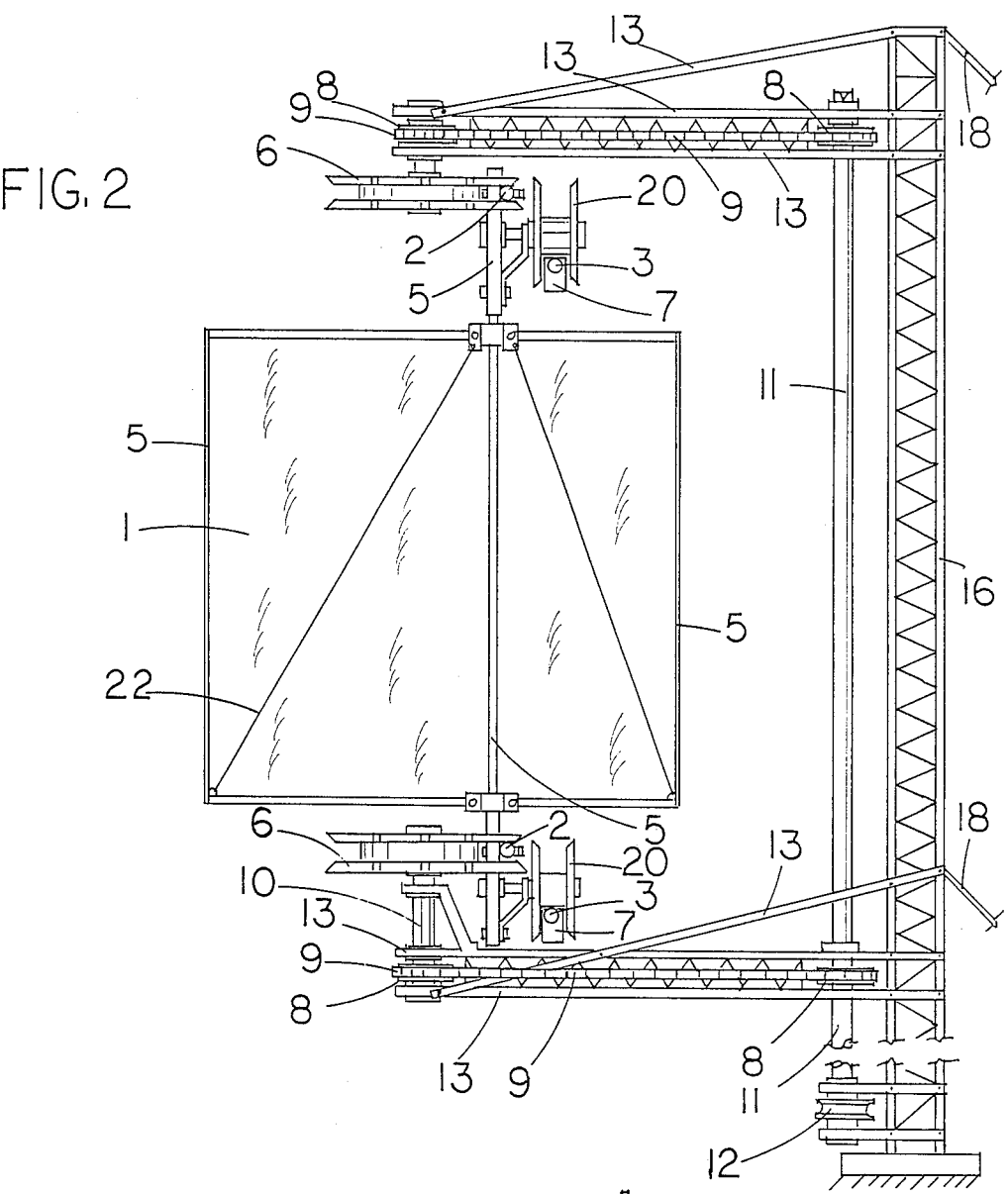
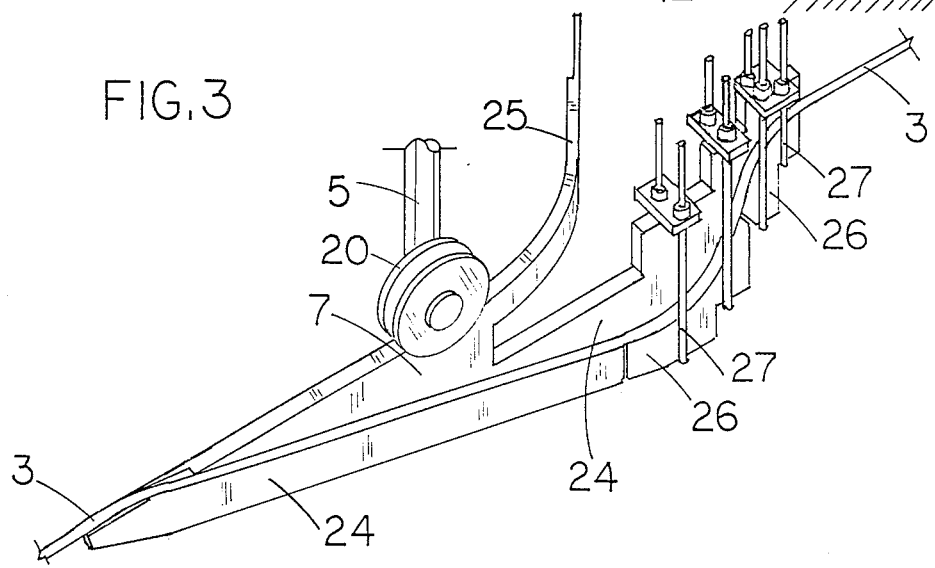

UNITED SAIL WINDMILL

BACKGROUND OF THE INVENTIONS

1. Technical Field

My invention relates to new designs of windmills in several types to obtain maximum benefit from the energy offered by the wind in a given limited space at a minimum cost, in a large commercial scale.

In the convertion of the wind energy particularly by means of the windmill, it is very essential that the windmill be in contact with as much wind as possible that passes thru a given space at the minimum cost of materials, labor, maintenance, operation cost, and minimum use of project space (land or sea), in order to provide a competative energy cost to the consumer. This maximization of wind-contact is done by the use of large wind sails made as large as possible, as in the sail boats, with the use of a specially designed mechanical device that handles the large sails in great quantities, at least cost.

In this invention, particular attention is concentrated on the maximum harnessing of the wind energy that is available in a given space in the maximum effeciency and effectiveness of energy convertion out of whatever strength of wind that arrives at the windmill at the least cost of energy production. It is also the objective of this invention to produce a large scale windmill that is capable of driving a large irrigation pump or to make a remote area energy independent by making the windmill able to work during violent weather conditions to a certain limit (when energy is abundant) and able to store the energy in the form of compressed air, electricity, and/or hydrogen gas fuel at any location (land or ocean). It is also the objective of this invention to make the ordinary man able to construct his own energy machine and to free the poor nations from highly commercialized high technology machines. It is to ease the pressing problems of having to import energy from other nations when in fact there is so much energy at home. This is to effect distribution of wealth and to promote peace around the world thru self sufficiency of energy.

2. Background Art

The first prior art is the rotary blade windmill which has very limited power output capacity because it cannot be expanded large enough as much as it is wanted so as to increase the wind contact. Increasing the wind contact of the old rotary windmill is done only by attaching longer blades but only to a limited extent because the tip of the blades will be moving faster than the wind—that means loss of energy. This means that the old rotary type of windmill cannot be constructed to a very large scale for purposes of having as much wind contact as it might be wanted. There are also existing new designs of windmills such as those that rotate around a vertical axis but they are just limited to small sails carried by a single rotating expensive superstructure and that 50% of the sails serve as wind break for the other sails thereby making 75% of the sails not really working. There are also many designs of windmills using horizontal elongated endless chains carrying the sails that move horizontally but they are just designed for short span, for few number of sails, for small sails, and for fair weather conditions—there being no sufficient inexpensive intermediary mid-span supports for heavy vertical loads and for lateral wind loads to make it able to function on high speed winds. They are fail to meet the requirements for the construction of low cost large commercial type of windmill that can take advantage of the abundant energy during violet weather. The construction of these existing old designs will be very expensive if they are made to carry very large wind sails.

The available wind being offered by nature is so much on land as well as on the ocean from sea level to 3 miles above the earth around the world, but the existing designs are just too small to tap the tremendous opportunity. From this view point, there must be another design of a windmill that can maximize wind contact any where at least cost in order to maximize benefits from the available wind, hence, the new inventions herein presented.

SUMMARY OF THE SUBJECT INVENTION

The "UNITED SAIL WINDMILL" is designed to solve all the aforwmentioned problems or impediments encountered preventing the large scale commercial use of the aforementioned prior arts, and further intends to accomplish the functions of the crises creating "OIL" and/or the dangerous expensive nuclear energy in the poor nations.

THE OBJECTIVES OF THIS INVENTION

1. To produce a large commercial scale windmill, built as large as space may allow in one setting of construction, with out additional construction of individual set-ups of integrated units of windmills;
2. To produce a large windmill that maximizes wind contact at a given limited space at the least expense of construction and operation (inland or ocean);
3. To produce a large windmill that can maximize benefit from the wind by taking the opportunity of collecting energy from the wind at higher wind speeds (during the times of abundance) and able to store said energy in large compressed air tunnels or other means of storing.

There are many existing designs of windmills in the form of sails moving horizontally around a vertical axis and some tugging endless chains but the existing methods and/or procedures in handling the sails are just for small sails, for short span of suspension, or for a few number of sails at very expensive support structures resulting to a low Wind-contact/Expense ratio, therefor, these existing designs cannot be used in large commercial scale, they being uneconomical. To come up with a design of high commercial competitiveness and to attain the objectives as set forth above, the following methods of embodiments have been conceived:

1. By making the sails in the form of square face, built out of durable fabrics that is framed on a light rigid frame, built as large as it can be handled by the support structures, held in place along one straight line in great quantities and do the same in the opposit line parallel to the first line, arranged along said lines close to one after the other on a single file with a clearance allowing each sail to flip to the left or flip to the right, each sail supported by a vertical mast attached to the one-third point of the sail's width;
2. By providing a means to carry the large sails thru a long line or span high above the ground such as an Aerial Cable Railway, as illustrated in FIG. 1, which relieves the Power Cable Chain from supporting the dead weight of the large sails—a situation that gives the opportunity to build the terminal stations further away from each other (may be a mile or more apart or accross mountain canyons), each sail being carried by deep groove roller wheels that rolls on said Aerial Cable Railway at the top and at the bottom of each sail mast;
3. By providing a means to support the Terminal Gear Wheels high above the ground that provides a clear and wide passage for the large sails to pass thru freely without the need of making the diameter of said gear wheels very wide to accomodate the width of the large sails while transmitting the energy to the Power Shaft as illustrated in FIG. 2, effectiveness in wind deflection is proportional to sail's width;
4. By providing a means to separate the First Line of parading sails far away from the Opposit Line of parading sails to give more Wind Contact to both lines by installing three Terminal Gear Wheels at a Half-Hexagonal formation at each level of the Power Cable and at each of the opposit Terminal Stations, as illustrated in FIG. 1;
5. By providing a means to reduce the load of the Aerial Cable Railway and to remove excessive sag of said catenary aerial railway—in the form of Intermediate Span Supports that are either directly on top of wood poles or suspended from ropes/steel wires, which do not interfer with the free rolling of the said Deep-Groove-Carrier Wheels on the aerial railway, as illustrated by Part #19 in FIG. 1,—a condition that gives the opportunity to build the terminal stations further away from each other (may be a mile or more apart) and also gives the opportunity for the aerial railway to carry much larger sails, at the same time these said Intermediate Span Supports will also prevent the aerial railway from swaying sideward due to the horizontal force of the wind;
6. By providing a means to carry the large sails thru a wider open free space such as the ocean thru the use of ocean going boats in the form of an "H" frame made of floater pipes filled with compressed air, each boat carrying one large sail and tugging a single Power Cable Chain that is common for all boats. Said power-cable chain loops around two terminal stations that are floating on the ocean set one mile or more apart from each other, each terminal station carrying three Terminal-Gear Wheels that are set in a Half-Hexagonal formation as illustrated in FIG. 4 and in FIG. 6;
7. By providing a means to carry the large sails thru the wide open plain fields such as a Railroad Track that provides a track for the Hook Roller wheels to guard against over-turning of the sails, as illustrated in FIG. 5, an opportunity to carry more larger sails;
8. By providing a means to store energy during times of abundance by allowing the windmill work at higher wind speeds and storing the energy in compressed air tunnels or in the form of hydrogen gas, thereby creating an opportunity to store the energy of the storm. This is done by providing extra control system to the large sails in the form of automatic breakage of the control string Part No. 4;

ADVANTAGES OF THIS DESIGN OVER THE PRIOR ARTS

1. There is more wind contact out of the project site space available and out of the volume of materials use at the least labor because the size of sail is maximized at the minimum support structures and the sails are placed close to each other;
2. The efficiency in deflecting the wind is much higher because the sails are made very large and very wide;
3. Slippage of the Power-Cable Chain thru the Terminal-Gear Wheels is prevented because of the presence drive teeth clamped to the said Cable Chain specially when there is too much sail to drive the Power-Cable Chain, thereby preventing the upper chain to move faster than the lower chain that will result to destruction of the whole windmill, and further, energy is more efficiently transmitted to the terminal gears;
4. There is much better opportunity to use larger sails and to put more quantities of sails into each unit of windmill because of the use of and/or the presence of the Aerial-Cable Railway that carries the whole weight of large sails, and more specially effective with the provision or the presence of Mid-span Intermediary supports to the Aerial-cable Railway as illustrated by Part No. 19 in FIG. 1, at a better wind contact it being that the large sails are more effectively carried high above the ground;
5. There is more flexibility in separating the First-Line of Sails far away from the Opposit-Line of parading Sails (may be 200 feet or more apart) for better wind contact—because of the Half-Hexagonal formation of the three Terminal-Gear Wheels at each level of each Terminal station, without having to use wide diameter gear wheels, as illustrated by Part No. 6 & 14 in FIG. 1 and by Part No. h in FIG. 4, FIG. 5 and FIG. 6;
6. There is better opportunity to construct the two (2) Terminal Stations further away from each other (may be a mile or more) specially on ragged terain, and make the windmill as large as desired, due to the presence of Mid-span Intermediate supports to the aerial cable railway without interference to the free flow of the sails;
7. It provides the opportunity to store the energy of the storm or the higher wind speeds because it can drive a compressor at high speed and store the energy in compressed air tunnels up to a certain limit of wind pressure upon the sails where the control string Part No. 4 breaks-off;
8. As illustrated in FIG. 4 and in FIG. 6, this design brings about the opportunity to use the wide and free open space of the ocean for industrial activity such as windmill project site, using ocean going boats to carry the sails in large sizes and in great quantities;
9. As illustrated in FIG. 5, this design opens the wide plain desert lands for industrial activity for the production of energy using much larger sails running on railroad track on the ground.

UTILITY

1. It is used for converting the energy of the wind into usable and storable energy in large commercial scale specially in the non-oil countries, in the form of compressed air, hydrogen gas, & elevated water;
2. It is used to produce large quantities of energy in the place where the energy is needed avoiding the construction of expensive transmission lines;
3. It is used to drive large irrigation pumps directly out of the wind energy;

4. It can be used to convert the ocean current by constructing it underwater.

It should be noted herein that because the wind has no constant force, it is most desirable that the wind energy be converted into compressed air which will drive the generator in order to have a constant voltage output. The irrigation pump and the compressor pump do not need constant force, so they can be connected to and driven directly by the windmill.

THE THREE TYPES OF UNITED SAIL WINDMILL

There are three types of newly invented windmill presented in this application, plus a fourth (4th) invention herein named as "LABRADOR CABLE RAIL SWITCH", as illustrated in FIG. 3. "Type No. 1 United Sail Windmill" as illustrated in FIG. 1 is in the form of an assembly of large wind sails in great quantities, each sail carried by deep groove wheels connected at the top and at the bottom of each mast rolling on and along suspended aerial cable railways that carry the whole weight of all the said large sails including the weight of the Power Cable and the deep groove wheels. Each said large sail tugs a Power Cable at the top and at the bottom of the mast, forming a long line of parade transverse to the wind in one direction and another long line of parade in the opposit direction after making a turn at the terminal gear wheels thru an aerial railway switch (on/off) which is illustrated in FIG. 3. The Power Cable is a strong rope which has teeth clamped to it in addition to the mast securely attached to it to drive the terminal gear wheels without slippage in order to maintain the vertical position of the sail masts by not allowing any of the Power Cables to move forward faster than the other Power Cable. There are two terminal loops of the Power Cable that are quite apart from each other (may be ½ mile or 1 mile or more) in order to contact more wind corresponding to the maximum strength of said Power Cable and the terminal gears and to accomodate more sails in the long line of the parade. There are three (3) Terminal Gears at every loop of each of the power cables, that are spaced one or two sails apart held in place at a half-hexagon formation by horizontal arms of a superstructure at the center of the loop or outside the loop as shown in FIG. 1. Said three (3) terminal gears at each loop of the upper power cable are synchronized to to each other by a synchronizing chain to collect the energy from each of said 3 terminal gears as they are all driven by the drive teeth of the power cable. The same procedure is done with the terminal gears of the lower power cable. The special design of the long horizontal arms of the superstructures supporting the terminal gears in a half-hexagon formation is to create a wide and spacious free passage of the large and wide sails thru the terminal station without using expensive wide diameter terminal wheel gears. The energy is collected at the terminal station thru power gear wheels interconnected by power chains. The speed of the upper power cable is synchronized with the speed of the lower power cable by the vertical power shaft as it is driven by the upper power chain and by the lower power chain at the same time in order to maintain the vertical position of the sails by not allowing either one of the power cable move faster than the other thru slippage or thru difference in circumference of the termianl gear wheels. The suspended aerial cable railway is a strong rope supported to be on level with the power cable, having a long span and beyond the terminal station, supported at intermediate points along its span length to act upon the heavy weight of the large sails and to act upon the strong horizontal force of the wind, as illustrated by part #19 in FIG. 1. This provision prevents excessive sagging and overloading of both the aerial cable railway and the power cable specially if the windmill is constructed to a very long span (a mile or more). It is also important to note that the mid-span intermediary supports (part #19) for the aerial cable railway provide a clear spacious passage for the large wind sails whether they flip to the right or they flip to the left as it has been done at the terminal station. Said mid-span supports, part #19, may be mounted on top of wood poles if installed to support the lower aerial cable railway, but for those part #19s installed to support the upper aerial cable railway they are held in place by high tension ropes transvers to the railway and suspended from top of wood poles or superstructures. It is also important to note that the groove of the carrier wheels (Part #20 in the drawings named Roller Pulley) must be deep enough at least 5 times the diameter of the rope aerial cable railway (Part #3 in the drawings named Steel Cable) so that said carrier wheels will not be derailed during strong winds as the weight of the large sails presses it down to the said rail. The aerial railway switch (Part #7 in FIG. 1 as illustrated in detail in FIG. 3) is a new special design to provide easy installation of aerial rail switch at the exact location to turn off/on for the carrier wheels (part #20). It is also important to note that it is a lot cheaper to construct using materials in tension rather than using materials in compression, this principle is done in this invention.

The second invention applied for in this application is the "Type No. 2 United Sail Windmill" as illustrated in FIGS. 4 & 6 which is in the form of an assembly of large wind sails (part a) in great quantities spaced at 2 sails apart, parading in a single file in a long line transvers to the wind in one direction and another long line of parade of the same kind in the opposit direction parallel to the first line as each sail makes a turn at each of the two (2) terminal stations that are constructed far apart at one or more miles apart, each sail carried by a large "H" frame floater or boat in the form of pipes filled up with compressed air, each boat tugging a common long endless cable chain which drives the terminal gear wheels at the said two terminal stations. Said terminal stations are carried by floating pipes filled up with compressed air, each station carries three (3) terminal gear wheels which are driven by said cable chain. This type of windmill can be floating on the ocean (may be international waters) or on a lake, or on a man made long channel. As in the "Type No. 1" windmill, this "Type No. 2" windmill may be provided also with mid span intermediary lateral support to prevent the boats from swaying away from the desired line of travel as the wind will push them sideward. This whole system may be submerged under water during violent weather by releasing the compressed air from the floater pipes that carry the boat and those that carry the said two terminal stations to save it from distruction by the storm. The two said terminal stations are being pulled apart away from each other by nylon rope or steel rope anchored to the ocean floor in order to stretch the cable power chain and make it taut full length as the sail boats pull the floating terminal stations toward each other. It is hereby emphasized to note the maner in which the sail mast is erected on each of the boats. Note that the mast is held erect by two struts both standing on one floater pipe that is nearer to the power cable chain, one strut leaning perpendicular to said floater pipe and the other strut leaning at accute angle from the front end of said floater pipe—thereby forming a right angle triangular pyramid with the mast vertical, the purpose of which is to be able to flip the sail to the left perpendicular to the floater pipe when it is fully blown up by the wind to place the force of the sail almost coaxial with the power cable chain, as the whole assembly should be positioned such that the boats will be cutting across the water waves to prevent tipping over during stormy weather. Another important feature of this invention is the Automatic Balancing Load referred to in FIG. 6 as part "M", a counter weigth that moves across the boat opposit to the weigth of the sail actuated by the flipping of the sail to the left or to the right assisted by compressed air or other mechanical devices, in order to add stability to the boat without enlarging the boat. Compressed air will be delivered to the land by pipes.

The third invention applied for in this application is the "Type No. 3 United Sail Windmill" as illustrated in FIG. 5 which is in the form of an assembly of large wind sails (part a) in great quantities spaced at 1 sail apart, parading in a single file in a long line transvers to the wind in one direction and another long line of parade of the same kind in the opposit direction parallel to but at least 200 ft from the first line as each sail makes a turn at each of the two terminal stations that are constructed on the ground far apart (one or more miles) from each other, each sail being carried by a vertical mast the bottom of which is on deep groove roller Rail Wheels rolling on a ground rail road track that makes a closed loop around the said two terminal stations. The said mast is held vertical by two struts each base of which is on deep groove roller Rail Wheels rolling on the inner ground rail track that is parallel to about ½ sail-width away from the said first rail track. The top ends of said struts are securely connected to the upper third point of the mast forming an equiangular triangular pyramid structure (parts e & d). The bottom of the mast (part e) is laterally supported by rigid braces connected to the bottom of said struts to keep the mast (e) always vetical. Rigid braces are also used to keep the wheels of the said struts stay vertical and to keep the correct distance between said struts. The base of said two struts are connected to the Power Cable Chain (part b) by key clamps (part g) which also serve as drive teeth to drive the terminal gear wheels (designated as part h—power pulley in FIGS. 4 & 5). The Power Cable Chain (b), being tugged by each of the large sails, moves thru its loop around the said two terminal stations, and drives the terminal Gear Wheels by means of its drive teeth that fits snugly into the key-notch of the Gear Wheels at each terminal station. There are three Gear Wheels (part h) at each station, arranged to form a half-hexagonal formation with a wide diameter to make the opposit traffic of sails receive more wind it being at least 200 ft away from the first line, and synchromized to each other by a gear chain that collects the energy from each gear wheel that is imparted to it by the power cable chain and to prevent slippage. The rail track may be in the form of a channel beam laid on its side so that the Hook Roller will be running under the top flange, or that the rail track may be in the form of rectangular timber beam elevated at least one foot clear from the ground so that the Hook Roller will be running under the rail it being that the rail wheels as well as the Hook Roolers will all be deep groove rollers. The Hook Rollers are necessary to prevent the whole sail assembly from overturning during strong winds.

BRIEF DESCRIPTION OF THE DRAWINGS

FIG. 2 is a side elevation view of the Power Terminal Station.
FIG. 3 is a detail drawing of the cable rail switch.

DESCRIPTION OF THE DRAWINGS: (as elected specie)

Figure 1:
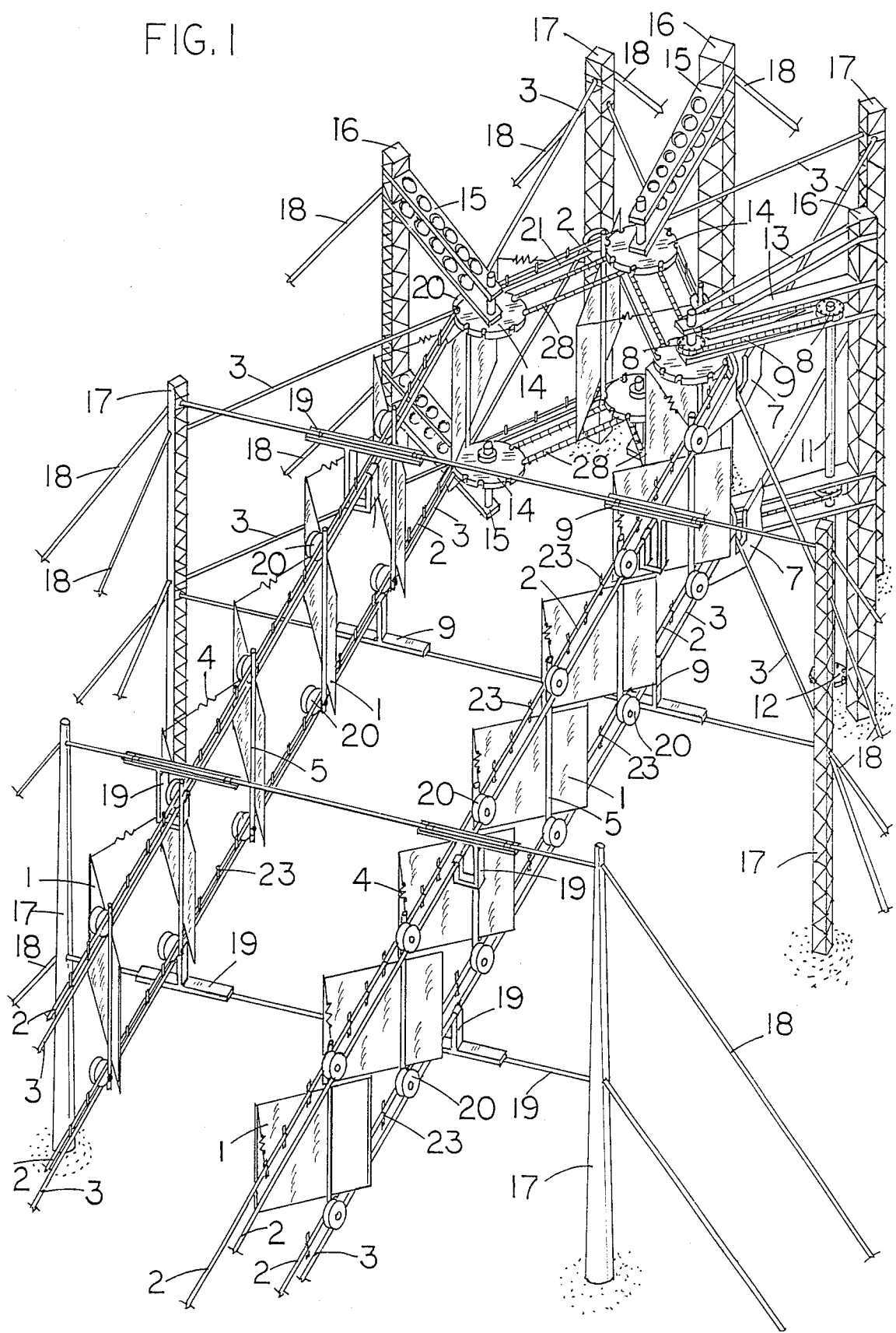
FIG. 1 is a perspective view of the windmill.
Figure 4:
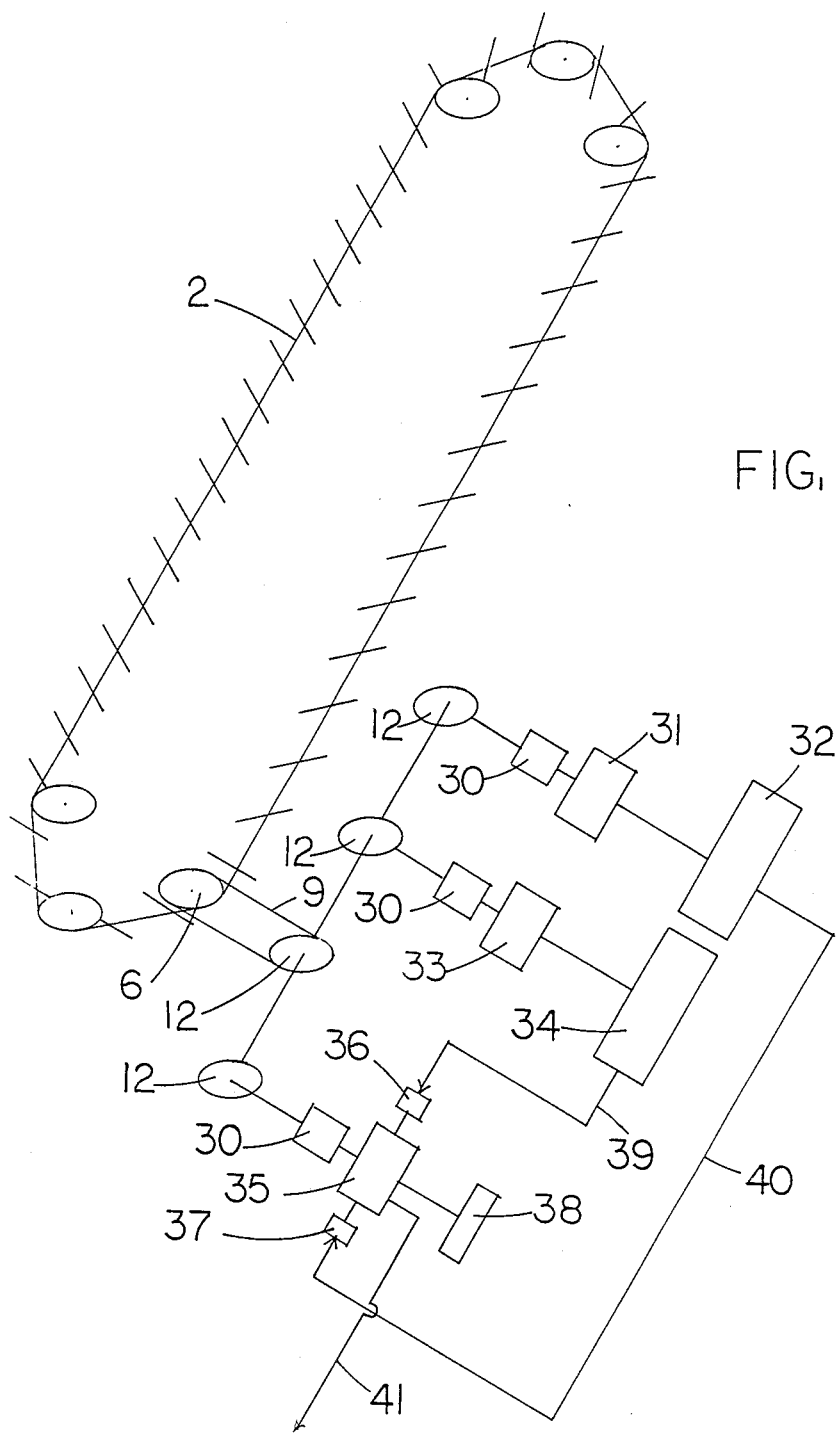
Figure 5:
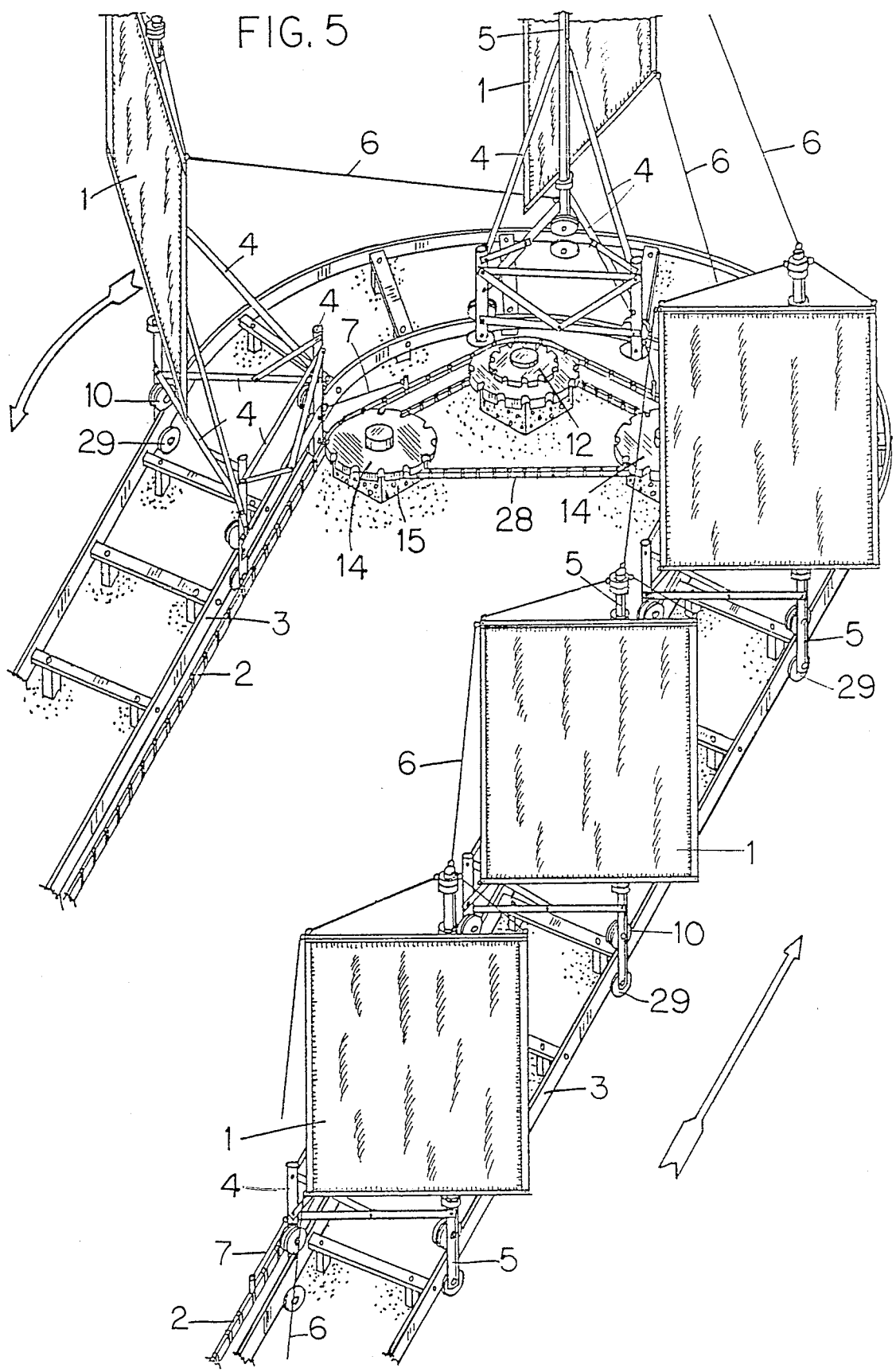
Figure 6:
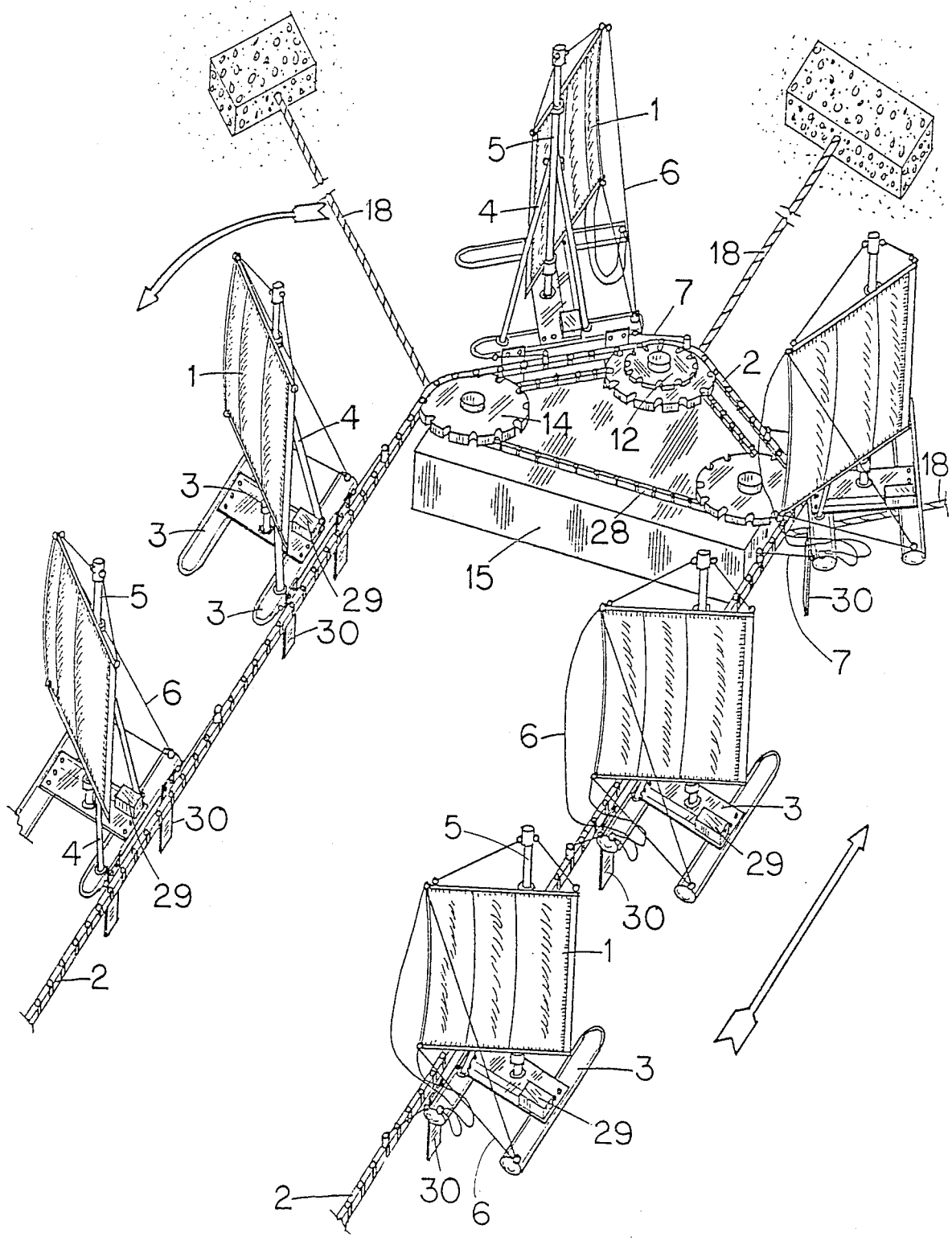

FIG. 1 is a perspective view of the "Type No. 1 United Sail Windmill" which consist of large square face wind sails Part No. 1 that are arranged close to each other on a single file straight line transverse to the general direction of the wind and all moving to one direction, each sail making a turn around at the terminal station that consist of the Terminal Gear Wheels Part #6 & #14, and then follow another straight line parallel to the first line but moving to the opposit direction and then making another turn around at the opposit terminal station that is far from the first terminal station and then follow the first aforemention straight line. Each sail is supported by the mast #5 which is in turn supported by the deep groove roller wheel #20 connected at the top of the mast and at the bottom of the mast. Roller wheel #20 follow a rail track #3 which is called the Aerial-Cable Railway that is supported by post structure #17. The Aerial-Cable Railway is provided with cable-rail switch #7 to allow roller #20 go on/off the cable railway #3 at the point of the terminal gear wheels #6 & #14. A rail bar #21 is provided at each level of railway at each terminal station for roller #20 to follow-on as it makes a turn-off from the switch #7 to turn around the terminal gears. The terminal gear wheels are provided with notch or teeths enough in size to catch the tip of the masts #5 and also to catch the drive teeth #23 that is clamped to the Power Cable #2 which is an endless cable-chain that makes a loop and drives the terminal gear wheels (Power Pulley) #6 & #14 by means of its drive teeth #23 and by the tip of the mast #5. The upper tip of the mast #5 is clamped to the upper Power Cable #2 while lower tip of the mast #5 is clamped to the lower Power Cable #2 so that the sail #1 will drive the upper and the lower Power Calbe #2 at the same time. Control string #4 holds the sail #1 against the force of the wind be it flipped to the left or flipped to the right until it breaks off up to a certain high pressure limit of the wind to save the sails #1 from destruction during violent storm. There are three (3) terminal gear wheels #6 & #14 arranged in a Half-Hexagonal formation at every level of the Power Cable #2 at each of the two terminal stations in order to separate the first line of sails away from the second line of sails with out having to use wide diameter gear wheels at the terminal stations—the purpose is to have better wind contact for the second line of sails. Several structural supports called the Mid-span Intermediary Support #19 are provided along the span of each of the aerial-cable railway #3 (upper and lower level) in order to prevent sag and overload of said railway which carry the whole weight of the sails #1, the Roller Pulley #20, and the Power Cable #2. The supports #19 holding the cable railway #3 may be suspended from high tension catenary wires or ropes from post structures. There are two (2) Power Terminal Stations constructed far apart from each other (may be a mile or more apart), a structural arrangement as shown in FIG. 1—the other Power Terminal Station at the left not shown it being of the same kind of structure as shown at the right end, thru which the the Power-Cable Chain #2 makes a loop to drive the Terminal Gear Wheels §6 & #14 and thru which the sail #1 makes a turn around. Diagonal brace string 22 makes the sail #1 stay square against its own weight.

FIG. 2 is a side elevation view of the Power Terminal Station showing a wide free and clear passage of the large sail #1 be it flipped to the left or flipped to the right. Structural support #13 and #15 holds axil #10 stay rigidly vertical against the horizontal force of the Power-Cable Chain #2 upon the Terminal Gear Wheel #6 & #14. The concentrated mechanical energy is transmitted thru Power Gear #8 by the Power Chain #9 to the Power shaft #11 which drives the Power Take-Off #12. Another very important function of the Power Shaft #11 is to synchronize the exact equal rotation of the Terminal Gear Wheels #6 (upper & Lower) in order to make the sail #1 stay always vertical by not allowing the upper Power-Cable Chain #2 move faster than the lower Power-Cable Chain #2—Power Chain #9 being the controlling chain. Post structure #16 holds against all vertical loads and against all horizontal forces while it is being assisted to stay erect by guy wires #18. FIG. 2 also illustrates how the mast #5 passes and drives the Terminal Gear Wheels #6 (upper & lower) thru its notches. It should be noted that the Power Cable #2 does not drive the Terminal Gear Wheels #6 & #14 by friction on the lips but rather by its drive teeth #23 and mast #5 in order to prevent slippage and to keep the upper and the lower Power Cable #2 stay in equal pace to each other so that the sails will stay vertical at all times, as a minute difference in circumference among the drive pulleys will destroy the whole windmill.

FIG. 3 is a detail drawing of the "Labrador Cable-Rail Switch" that can be conveniently clipped to an existing suspension rope or cable at the exact point of turn on/off for a deep groove roller wheel as desired—designated as part #7 in FIG. 1. Part #24 may be a solid steel plate with deep groove to house the cable rail or may be a laminate steel plate to create the deep groove, which is provided with a curved tangue #25 to guide the out-going or in-coming roller wheels #20. The Clip block #26 has a deep groove to house the cable rail. The Clip Bolts #27 are made of U-type which hold the block #26 step-by-step tightening until its top surface #25 becomes horizontal.

BEST MODE FOR CARRYING OUT THE INVENTION: (as elected specie)

As stated in the forgoing summary, the main objective of this invention is to maximize wind contact at the minimum use of materials and at the minimum use of space. The more steady and higher wind speed is located high above the ground. The wind is most efficiently deflected by a large, wide, square-faced wind sail that forms a concave surface against the wind. Referring to FIG. 1, the sail #1 is made of durable fabric materials attached to a large, light square frame #5 which is made of light materials such as aluminum pipe, in order to build a concave, large, light sail. For better wind speed, this sail must be placed high above the ground and must be moving horizontally at transverse to the general wind direction—and the most logical and most economical carrier for the large sail on this condition is a two level Aerial-Cable Railway #3 that is provided with mid-span intermediary supports #19 at regular interval all along the span lengths to prevent sag and overloading. To maximize wind contact out of the available project space and out of the available railway span, the large sail #1 must be arranged on a single file along said railway close to each one after the other but with clearance between sails to allow every sail to flip to the right or to the left. A deep-groove Roller Wheel #20 is attached to the top and to the bottom of each sail mast #5 to carry the top of the sail along the upper level railway and to carry the bottom of the sail along the lower level railway #3 respectively. The groove of said Roller Wheels #20 is deep enough at least 5 times the diameter of the cable Railway #3 so that it will not get off the aerial railway during the violent weather. Another line of two level aerial railway #3 is built parallel to the first line of aerial railway to carry the sails that are moving to the opposit direction and returning to the point of origin. This opposit railway is also provided with intermediary supports #19 at the upper level and at the lower level for the same reason as the first—that is to prevent sag, overloading, sideward swaying due to the horizontal wind forces, and to be able to build a very long aerial cable railway at a generally horizontal posture, and to be able to carry much larger sails at lesser stress. It should be noted at this point that one of the main objectives of this invention is to build a large commercial scale windmill—that is to make the sails as large as possible and to accomodate as many sails as possible into this aerial-cable railway system, that is why the mode should be to build the railway as long line as the project space allows—to make the windmill more and more powerfull without the necessity of building additional set up units of windmills. For further better wind-contact, these two opposit aerial railways must be built far away from each other (say 100 or 300 feet apart) so that the second line of sails that is behind the first line of sails will be located in a area where the wind has regained speed in a laminar flow after bumping with the first line of sails. This condition requires the three Terminal Gear Wheels #6 & 14 (named power pulley in the original drawing FIG. 1) held in place far apart from each other in a half hexagonal formation for every level of the end loop, to effect separation of the two lines of sails sufficiently without the use of expensive wide diameter gear wheels. This set of three Terminal Gear Wheels #6 & #14 holds firmly and stretches tautly the end loop of the upper level Power Cable #2, and another set of three Terminal Gear Wheels #6 & #14 do the same to the opposit end loop of the upper Power Cable #2 at the left terminal which is not shown in the drawing FIG. 1. The same proceedure of the terminal gear wheels #6 & #14 is done with the left and the right end loops of the lower level Power Cable #2. Both the upper level and the lower level Power Cable #2 which have equal lengths are tautly strung by the Half-Hexagonal Sets of terminal gear wheels #6 & #14. All the upper ends of the vertical mast #5 of each sail are functionally attached to the inner side of the upper level Power Cable #2, and all the lower ends of the vertical masts #5 of each sail #1 are also functionally attached to the inner side of the lower level Power Cable #2 in equal spacing close to each other but allows the sails to flip to the left or to the right. It should be noted at this point that the circumference of each of the Terminal Gear Wheels #6 & #14 is equal to the spacing of the sail masts #5 because there will be a special notch at one point of the circumference of each said gear wheels to catch the masts #5, and there will be smaller notches around the circumference of each said gear wheels #6 & #14 to catch each of the drive teeth or keys #23 that are also clamped on the inner side of said Power Cable #2. It should be noted again at this point that the said Power Cable #2 drives the Terminal Gear Wheels #6 & #14 by its drive teeth or keys #23 and by the ends of the Masts #5 and not by its friction upon the groove of said gear wheels #6 & #14—therefor, said gear wheels should so constructed that the Power Cable #2 will not be touching the inner surface of the grooves which should be lubricated. In this way, the speed of the Power Cable #2 will be controlled by the notches on the said Gear Wheels #6 & #14 so that the upper level and the lower level Power Cable #2 will be moving in equal pace to keep the mast always stay vertical—not being affected by the small differences in circumference between the said Gear Wheels #6 & #14. As there will be more sails being attached to the Power Cable #2 by making it longer, it will have more driving force upon the Gear Wheels #6 & #14—which condition requires more drive keys #23 clamped to the Power Cable #2 between the masts #5 and correspondingly more notches made on the circumference of the Terminal Gear Wheels #6 & #14 to match the power capacity of the windmill. A Power-Support Chain #28 is necessary to collect the mechanical energies of the Terminal Gear Wheels #14 and to deliver said energies to Gear Wheel #6, for every end loop of the upper and lower level Power Cable #2, in order not to overload the notches of Gear Wheels #6. Please see page 4 line 13 of the specifications as originally filed for this part #28—not shown in the drawings.

As the Power Cable #2 makes a turn around at each end loop thru the three Terminal Gear Wheels #6 & #14, it carries with it the sails which also makes a turn around thru the terminal station. The vertical sail masts #5 do not cross the Aerial Cable Railway #3 in executing the turn around, it being located on the inner side of said railway, so it is free. The one that has problem is the carrier Roller Wheel #20 (named as Roller Pulley #20 in FIG. 1 & FIG. 2) which is solved by installing the Rail Switch off/on #7, as shown in FIG. 1 and as illustrated in details in FIG. 3, clamped to the Aerial Cable Railway #3 right at the point where the Carrier Wheel #20 makes a turn. Bar Rail #21, (which may be supported by catenary suspension cable, or it can be in the form of Aerial Cable Railway #3 if the Terminal Gear Wheels #6 & #14 are far apart from each other), is necessary to make a continuation of the Cable Railway #3 going around the Terminal Gear Wheels #6 & #14 making a closed-loop railway—in order to carry the large sails while they make turns around the terminal station transfering to the opposit traffic. Brace String #22 is necessary to keep the sail stay square against its own weight. For larger sails, additional stiffener wires or strings may be built with the frame #5. Control String #4 (named in the drawing FIG. 1 as Nylon Tie String) is necessary to hold the sails stay rigid against the wind but allows the sail to flip to the right or to the left as the sail makes a turn around at the terminal station. This Control String #4 is calibrated to snap-off at a certain high speed limit of the wind and turn the sails neutral—in order to make the windmill work at high wind speeds to take advantage of the abundance of energy but it will save the windmill from destruction when the storm is already very violent. This snap-off provision may be a short-hook string with calibration, that can be replaced easily after the violent weather while the storm is still tapering off and catch up for the abundant energy.

Referring to FIG. 2, it can be observed that the Terminal Gear Wheels #6 at the upper level and at the lower level both drive the Power Shaft #11 in a synchronous maner thru the Gear Shaft #10, the Power Gears #8, the Power Chain #9—at the upper level and at the lower level respectively in order that the sail #1 will stay erect all the time by controlling the Power Cable #2 at the lower level and at the upper level to move in equal pace. It can be observed also the Power Shaft #11 ultimately drives Power Take-off #12 to which utility machineries, such as, compressors, electric generators, rock crushers, etc, may be directly operatevely connected. The supperstructure #13 & #16 holds the moving mechanical parts in place and provides a very spacious clear passage for the sail #1 to flip to the right or to flip to the left as it makes a turn around thru these three structures at the terminal station. The Bearing that holds the Gear Shaft #10 is made adjustable to aline the Terminal Gear Wheels #6 and #14 in accordance with the catenary slope of the Power Cable #2 if not alternatively that the Aerial Cable Railway #3 is made horizontal at the approach of the Gear Wheel #6 by means of the intermediary support #19. The tip of supperstructures #13 & #15 are rigidly prevented from swinging to the right or to the left around the Post #16 by means of high tension ropes tied to Posts #17 that are erected on strategic points supporting the Aerial-Cable Railway #3 and the intermediate supports #19. The Guy Wires #18 are necessary to support the Posts #16 & #17 and keep it rigidly vertical. For smaller windmills, the support Posts #16 & #17, and the structural arms #13 & #15 may be in the form of simple wood poles, in order to bring down the cost. The same kind of support structures and mechanical configuration is built at the left end of the loop and serves as second terminal station—which is not shown in the drawings it being the same picture shown at the right end. Lastly, it should be noted again that the right mode in this invention and in any kind of construction project is to use more materials on tension stress rather than on compressive stress in order to minimize use of materials—as illustrated by the use of Aerial Cable Railway #3, the use of the Power Cable #2 which is in the form of rope instead of an interlink steel chain as a drive chain, the use of suspension ropes or wires to lift the mid-span intermediary supports #19 to the Aerial Cable Railway, and the use of Guy Wires #18 to keep the Posts #16 & #17 stay rigidly vertical.

What I claim for which protection by a patent is applied, are defined as follows:

1. A "Type No. 1 United Sail Windmill" as illustrated by FIG. 1 and supported by detail drawings FIG. 2 and FIG. 3,—that converts the energy of the wind into mechanical energy for the production of consumable energy in the form of compressed air, electricity, hydrogen gas fuel, and elevated water, and/or to serve as direct prime driving machine, comprising:

A plurality of large square-faced wind sails, made of light thin metal sheets or strong light cloth/fabrics fastened together to a light strong square frame, put together in great quantities, arranged in a single file procession closed to each one after the other with a clearance to allow each sail to flip to the right or to flip to the left and moving along a long straight line in one direction and along another long straight line parallel to the first line but moving to the opposit direction—transverse to the general direction of the wind;

A vertical mast for each sail, made of light strong materials such as bamboo poles or reinforced aluminum pipes, that holds the sail in place at vertical posture and at the same time serves as frame member to which the said fabric is attached to, the top end of which is reinforced by steel pipe or bar that is securely attached to the upper Power Cable Chain to serve as drive teeth of said Power Cable Chain, the bottom end of which is also reinforced by steel pipe or bar that is securely attached to the lower Power Cable Chain to serve as drive teeth of said Power Cable Chain;

A pair of Power Cable made of strong rope, one at the upper level and one at the lower level as mentioned above, which are tugged by each of said large sails moving in equal pace, which form an endless drive chain having two end loops that are quite apart from each other (may be ½ mile or more apart), to which the upper end and the lower end of each sail-mast are securely attached respectively, which are provided with drive teeth by clamping to same three or more vertical short bars in between the spacing of each sail-mast that are strong enough to drive the terminal gear wheels;

A set of three Terminal Gear Wheels arranged in a half-hexagonal formation to hold and stretch out each of the end loops of the said upper level and the lower level Power Cable, which are driven by said Power Cable thru its drive teeth that fit into the notches on the circumferencial edges of the said Gear Wheels;

Said three Terminal Gear Wheels are quite far apart from each other such that the half-hexagonal formation has a radius of 100 feet or more in order to sparate the two long parallel lines of sails away from each other for better wind contact;

An Aerial-Cable Railway parallel and 1 to 3 inches close to each and every level and every line of said Power Cable, which is a high tension steel or nylon rope, suspended or held in place by tall posts or steel towers separate from the support posts for the said terminal gear wheels, which will carry the whole weight of each and every sail including the weight of the Power Cable plus the weights of the deep-grooved carrier Roller Wheels, which will hold the sails from swaying sideward due to the horizontal forces of the wind, and which will relieve the Power Cable from vertical loads at the same time prevents overloading of the Terminal Gear Wheels;

A deep-grooved carrier Roller Wheel securely attached to the top end and to the bottom end of each and every sail-mast at the point where the Power Cable is also connected to each mast, which rolls on said Aerial Cable Railway carrying the sail as being pushed by the wind, the deep groove of which being at least 5 times the diameter of the Aerial Cable Railway so that it will not be de-railed during violent weather or when it is working with high speed winds;

An Intermediary Suspension Support in the form of catenary wires or ropes strong in various strategic poinsts along the span length of said Aerial Railway, transverse to and connected to various strategic points of the upper level said Aerial Railway by means of an erect "T" connectors with the tip of its bottom hook being the one clamped to the said railway to lift it from below giving clear passage of the carrier roller wheels, and connected to various trategic points of the said lower level Aerial Railway by means of an inverted "T" connectors with the tip of its tail being the one clamped to said railway to lift it up from below giving clear passage of the carrier roller wheels running on the lower level Aerial Railway, the purposes of which are to provide right support (vertically and horizontally) to the Aerial Cable Railway to prevent sag and to provide the opportunity to build longer lines of aerial railways;

A Cable-Rail Switch as illustrated by FIG. 3 named in the summary as "Labrador Cable-Rail Switch", made of laminated steel plate or hardwood plate (depending upon the kind of Aerial Railway) with a deep groove to house said cable railway and provided with clipping accessories such as "U"-Bolts and clipping block, and further provided with a horizontal arc-tang to guide the deep-groove carrier roller wheel, which is clipped to the Aerial Cable Railway at the location of every Terminal Gear Wheel at the exact point where the sail-mast is forced to make a turn by the Power Cable, in order to effect smoth transfer of the sails from one Aerial Railway to the next Aerial Railway of different direction;

A Terminal Power Station as illustrated in FIG. 2 constructed at each end loop of the Power Cable (the right end and the left end of the windmill) which is an assembly comprising (a) the aformentioned set of three Terminal Gear Wheels in a Half-Hexagonal formation, (b) a vertical Gear Shaft holding each and driven by each of the said Terminal Gear Wheels, (c) a Power Gear held and driven by each of the said vertical Gear Shafts, (d) a Power Support Chain which interlocks the upper level set of three Terminal Gear Wheels and another Power Support Chain interlocking the lower level set of three Terminal Gear Wheels to remove concentration of force upon the said first Terminal Gear Wheel being exerted by the said Power Cable, and to serve as energy collection agent;

A vertical Power Shaft, being a part of said Terminal Power Station, which holds and being driven by an upper level Power Gear and by a lower level Power Gear;

A Power Chain, being a component of said Terminal Power Station, which interlocks the Power Gear attached to the Gear Shaft of the said upper level first Terminal Gear Wheels with the Power Gear attached to the upper end of the said Power Shaft, and another Power Chain (the same kind and length as the first) interlocking the Power Gear attached to the Gear Shaft of the said lower level first Terminal Gear Wheel with the Power Gear attached to the lower end of the said Power Shaft, by which the said vertical Power Shaft is driven by the Terminal Gear Wheels, and by which the forward pace of the upper level Power Cable is controlled to become equal to the forward pace of the Power Cable at the lower level, so that the sail-mast will stay vertical at all times—not being affected by the small differences in circumference among the Terminal Gear Wheels it being that they have equal number of circumferencial notches or teeth;

A Power Take-off Gear Wheel securely attached to the bottom tip of the said vertical Power Shaft;

A Diagonal Brace String tautly tied to the bottom-outer corner of the sail frame and connected to the top-inner corner of said frame to make the sail stay square against its own weight;

A control string tied to the outer-top corner and another string tied to the outer-bottom corner of each sail that hold the sail stay rigid against the wind by tying its opposit end to the upper end of the succeeding sail-mast and the opposit end of the lower control string tied to the bottom end of the said succeeding sail-mast, holding the sail 45 degrees with the Power Cable;

Said control string is provided with a Short-Hook String that is calibrated to snap-off to release the sail automatically during violent weather or when the wind speed becomes beyond the working limit, making the sail neutral to the wind to save the whole windmill from destruction;

A Horizontal Arm Structure for each and every Terminal Gear Wheel, long enough to hold one said wheel away from the support post to provide clear passage of the large sails when they flip towards the said support post due to the wind direction, and strong enough to hold the said Terminal Gear Wheel in correct position against the high tension Power Cable pulling it outward;

A Support-Post Structure for every pair of Horizontal Arm Structure (upper and lower level) to hold same high above the ground for a better wind contact, which can be in the form of wood poles or in the form of steel towers;

A support post structure for every end of the Aerial Cable Railway and for every end of said Intermediary Suspension Support, each support post structure carry two levels of Aerial Cable Railway or two levels of Intermediary Suspension Support;

Guy Wires to hold and keep erect all Support-Post Structures;

A Transmission Gear, stick-shift, 5 or more speeds, driven by said Power Take-off Gear Wheel, to increase or decrease driving speeds depending upon the wind speeds and/or power output of the windmill;

An air compressor, driven thru said Transmission Gear, to produce compressed air and store same in large tunnel reservoirs;

An electric generator driven by an air turbine;

An elecrolizer to produce oxygen and hydrogen gas fuel out of the electricity generated by electolysis of water;

A water pump driven thru said Transmission Gear to store energy in the form of elevated water.

* * * * *